Sept. 24, 1957     M. W. TURNER     2,807,115
BOBBER WITH FLOAT CONTROLLED LINE
Filed Oct. 27, 1955
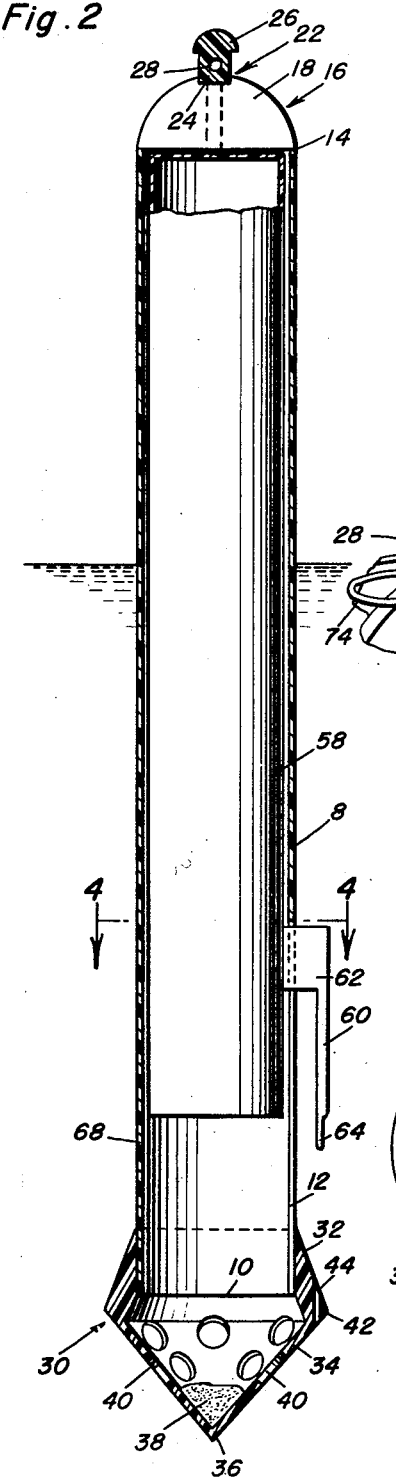
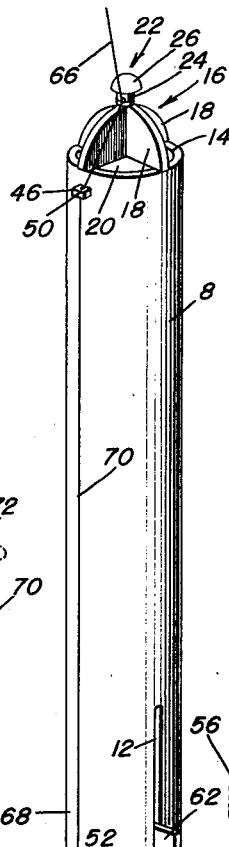
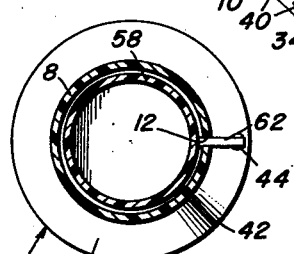
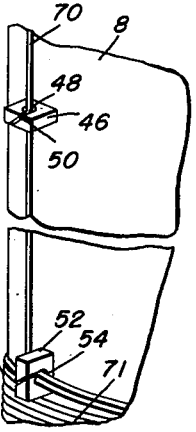
Marion W. Turner
INVENTOR.

United States Patent Office 2,807,115
Patented Sept. 24, 1957

2,807,115

BOBBER WITH FLOAT CONTROLLED LINE

Marion W. Turner, Concrete, Wash.

Application October 27, 1955, Serial No. 543,142

5 Claims. (Cl. 43—43.11)

This invention relates to a casting and fishing bobber having improved means whereby a predetermined amount of the fishing line, called the leader portion here, may be temporarily wrapped and stored thereon to effect a reliable cast, and which is float controlled and released to pay-out and descend into the water being fished when the bobber lands atop the water at the intended fishing spot.

An object of the invention is to provide a comparatively simple, economical, structurally practical and efficient fishing device which will appeal to the fisherman who desires a device which serves as a depth finder and also as self-adapting controlling means, whereby the leader portion, which has been stored to make the cast, is automatically released and allowed to descend to the desired level above the bottom of the body of water.

More specifically the invention in its preferred embodiment comprises a suitable hollow body adapted to assume a substantially vertical fishing position in the water at the end of the cast, a float confined and slidingly mounted in said body, means fixed on the upper end of said body whereby said body may be adjustably and removably connected with a portion of a fishing line at a predetermined distance above the usual baited and weighted lower end of said line, the lower end portion of said body being exteriorly shaped and suitably adapted to permit a substantial part of the leader-portion of said line to be hand wound and temporarily wrapped and stored thereon during the casting step, and a trigger-latch arranged exteriorly of said body and cooperable with said body and windings of the line to maintain the windings intact and stored, as intended, during the time of the cast and functioning to liberate the windings in a manner to permit the baited end of the line to pay-out at the end of the cast, said trigger-latch being rigid and connected to said float for simultaneous operation therewith.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a bobber wherein the leader portion of the line is wound and stored and latched in place ready for casting;

Figure 2 is an enlarged view, partly in section and partly in elevation, with the fishing line omitted and showing the trigger-latch in its raised line winding and releasing position;

Figure 3 is an enlarged fragmentary perspective view of the upper end of the bobber showing the manner of attaching the bobber to the fishing line;

Figure 4 is a section on the line 4—4 of Figure 2;

Figure 5 is a fragmentary perspective view on a still larger scale detailing upper and lower line guiding lugs; and Figure 6 is a fragmentary sectional and elevational view showing how the baited end of the line is latched and held.

Referring now to the drawing the body, which is of a suitable material, is denoted by the numeral 8. It is an elongate open ended cylinder the lower end of which is denoted at 10 and which has a longitudinal slot 12 formed therein opening through said lower end. The upper end 14 is provided with a suitably integrated cruciform spider 16 the radial portions 18 of which are circumferentially spaced and provide water openings 20. On the center or crest of the spider there is a button-like member 22 which is, broadly, the means whereby the cylinder or bobber is detachably and adjustably connected with the fishing line. This comprises a shank 24 having an enlarged suitably shaped head 26 on its upper end and provided with a line threading hole or eye 28.

The lower leading end of the body or cylinder is substantially closed by way of a piloting head 30. This has an upper portion and a lower portion. The upper portion is telescopically fitted over and attached to the lower end portion 10 and flares downwardly and outwardly, gradually increasing in diameter. This provides an annular shoulder which not only facilitates wrapping and storing the line but assists greatly in progressively and orderly releasing the line windings in a manner to be described. The lower portion 34 is conical and its apical end 36 is axially aligned with the body. The numeral 38 designates a lead or equivalent weight which functions to keep the bobber upright or vertical in the water as illustrated in Fig. 2. The desired water inlet and discharge holes are denoted at 40. At the juncture of portions 32 and 34, the largest diameter of the head, as at 42 is a vertical bore 44 which constitutes a keeper hole.

On one side adjacent the upper end there is an outstanding lug 46 having a line guide hole 48 and a line feeding or entrance slot 50 registering with the hole. As shown in Fig. 5 this is the horizontally disposed upper lug. Below it there is a vertically disposed outstanding and suitably aligned lower lug 52 having a line guide hole centrally arranged at 54 and a radial suitably angled entrance slot 56. This is also used as a line snubbing member, as will be later clarified.

The line controlling float is confined within the cylinder or body and is elongate and denoted by the numeral 58. The numeral 60 designates a trigger-latch which is rigid and linearly straight and is disposed in spaced parallelism on the exterior of the body. The upper end is suitably constructed at 62 and is joined with the float and is keyed in the slot 12. The lower free end 64 is lined up with and adapted to telescope into the keeper hole 44 in the manner shown in Figs. 1 and 6.

The fishing line proper is denoted by the numeral 66 and that portion thereof which is directly cooperable with the body 8, and particularly the line winding and storing surface 68, is here called the leader portion and it is denoted by the numeral 70.

As will be evident the over-all bobber or device functions primarily to enable the fisherman to fish at some distance from a shore or boat at a controlled depth. Often lakes and water bottoms are covered with debris and the fisherman may desire to fish just off the bottom for this reason; or he may desire to fish at some depth other than the bottom for the simple reason that fish may bite better there.

Considering now the use and operation it will be evident that it is first necessary to attach the desired portion of the fishing line 66 to the bobber or, alternatively, to detachably and adjustably mount the bobber on the fishing line. In this connection it is to be kept in mind that the bobber is designed to be attached to or detached from the line without cutting. To start with, the depth of the water at the desired fishing spot is estimated and a liberal amount of line, enough to reach the estimated depth, is pulled from the reel and pole (not shown). Then, the fishing line is taken in hand and doubled upon itself as at 72 (Fig. 3). The bight portion 74 is formed into a sharp bend or point and is threaded through the line hole 28. Next the loop then existing to the left in full lines in Fig. 3 is directed or turned upwardly and the bight portion 74 is then on a diametrically opposite side of the button-like member 32. By thus handling the loop once or twice in conjunction with the button-like member the bobber is then attached to the fishing line 66. The tip of the leader portion 70 is now passed or threaded downwardly through the holes 48 and 54 in the lugs 46 and 52 as shown in Figs. 1 and 5. The trigger-latch 60 is raised by hand and the intended or desired leader portion 71 is wound or wrapped around the winding surface 68 and stored as illustrated in Fig. 1. The trigger-latch, that is the end portion 64 is seated and retained in the keeper hole 44 in the manner shown and especially detailed in Fig. 6. The bobber having thus been properly rigged is ready for casting in the depth finder.

During the depth finding step the cast is made in a conventional way. Upon landing atop the water the bobber as an entity settled, standing vertically by action of the weighted pilot head 30. The float 58 obviously rises to position shown in Fig. 2 lifting and removing the trigger-latch from the keeper hole. The line is then unwound and spooled off by way of the sinker 73 and hook 75. After giving the sinker ample time to reach the bottom a quick retrieve is made. This done in such a way as to force the float downward into the position where the trigger point 64 is seated in its keeper hole 44. To do this the pole is given a sudden quick jerk, retrieving the device rapidly. The sudden jerk forces the float downward and this seats the trigger-latch in the keeper hole again as shown in Fig. 1. The rapid retrieve keeps the device lying in a substantially horizontal position in the water and the water end is the upper end of the body and imposes pressure on the float and thus keeps it "down" preventing the leader portion from unwinding.

After completing the depth finding step the device is readied for fishing. It is taken in hand and the trigger-latch is raised to the "up" position shown in Figure 2. Then, the leader portion that had previously unwound for the depth finding step is taken in hand nearer the lower part of the bobber. If the fisherman desires to fish at two feet above the depth found he then winds two feet of the leader portion back on the winding surface 68 for storage and casting and at this foot point the leader portion is flipped into the lower slot 56 and corresponding hole 54 where it is then snubbed. The depth of fishing is always changed at this point without disturbing any of the line where it is attached to the button-like member 22. Obviously if the fisherman moves to deeper water than it becomes necessary for him to detach the line from the threading button and to wind an additional amount of the leader portion around the winding surface 68. After setting the leader portion for the proper depth as described the intended portion is wound around the winding surface 68 until the hook and sinker come into the position shown in Fig. 1. The cast is then made in the conventional manner. Upon striking the water the float 58 rises in the cylinder 8, causing the trigger-latch 60 to rise and release and to allow the hook and sinker to settle to the predetermined depth. For each cast the leader portion is wound and stored upon the device as shown and described.

Changes in shape, size, materials and rearrangement of the complemental parts may be resorted to in actual practice without departing from the spirit of the invention or the scope of the claims.

What is claimed as new is as follows:

1. A fishing line casting, paying-out and limiting device comprising an elongate hollow body cylindrical in cross-section and substantially open at its upper end, an elongated float also cylindrical in cross-section and confined and slidingly mounted for operation in said body, means fixed on and above the upper open end of said body whereby said body may be adjustably and removably connected with a portion of a fishing line at a predetermined distance above the usual baited and weighted lower end of said line, the lower end portion of said body being adapted to permit a substantial part of the leader-portion of said line to be hand wound and temporarily wrapped and stored thereon, and a trigger-latch having a portion connected to said float, said latch being operable between two positions in conjunction with said float, said latch having a major portion arranged exteriorly of said body, spaced from and cooperable with said body and line windings of the line when in one of said two positions to maintain the windings intact and stored, as intended, for instance, during the time of making a cast, said latch when in the other of said positions functioning to liberate the windings in a manner to permit the baited end of the line to pay-out at the end of the cast, said latch being movable between said two positions by movement of said float, the lower end portion of said body being provided with a lengthwise keying slot, and that portion of said trigger-latch which is connected to said float being keyed in and slidable up and down in said slot.

2. The structure defined in claim 1 and the combination therewith of a ported piloting head affixed axially to said lower end portion, a portion of said head being enlarged relative to said lower end portion and having a keeper hole therein into which the adjacent end of said keeper latch is removably held and from which it is withdrawn and released by the action of said float when the cast is completed and said body comes to rest on the water.

3. The structure defined in claim 2 and wherein said piloting head has an upper portion and a lower portion, said upper portion being joined to the lower end of said body and being circular in cross-section and flaring downwardly and outwardly and providing an annular shoulder of progressively increasing diameter which facilitates orderly uncoiling and liberation of the windings, and the lower portion being decreased in cross-section and tapering to a point and providing a conical piloting nose, said nose having water intake and discharge ports therein, and said keeper hole being located at the junction of said upper and lower portions.

4. A fishing line casting, paying-out and limiting device comprising an elongate hollow body adapted to assume a substantially vertical fishing position in the water at the end of the cast, said body being cylindrical in cross-section and open at its upper and lower ends and provided at said upper end with a head for connecting a fishing line thereto, the lower end portion of said body having a lengthwise keying slot therein, a piloting head affixed to and projecting axially beyond said lower end portion and having a keeper hole therein, said piloting head being hollow and provided with water intake and discharge ports, a float slidingly mounted in said body, and a trigger-latch connected to and operable in conjunction with said float and having a portion keyed for sliding movement in said slot and a lower end portion releasably engageable with said keeper hole said latch being adapted to retain in position a portion of said fishing line wound on said float when the latch is engaged with said keeper hole and also functioning to release said line portion from said float when the lower end portion of the latch is released from said keeper hole, said latch being released from said keeper hole by movement of the float due to buoyant action of the water.

5. The structure defined in claim 4 and wherein said trigger latch is primarily rigid and linearly straight, is located exteriorly of and in spaced parallelism to the cooperating surface-portion of said body, and a line-snubbing lug affixed to said surface portion and having a line guide hole and a slit extending radially from said hole and opening through a marginal edge of the lug.

References Cited in the file of this patent

UNITED STATES PATENTS

| | | |
|---|---|---|
| 2,125,718 | Haag | Aug. 2, 1938 |
| 2,220,358 | Storey | Nov. 5, 1940 |
| 2,566,612 | Hearne | Sept. 4, 1951 |
| 2,605,576 | Young et al. | Aug. 5, 1952 |
| 2,694,878 | Martens | Nov. 23, 1954 |
| 2,720,720 | Landrum | Oct. 18, 1955 |

FOREIGN PATENTS

| | | |
|---|---|---|
| 121,221 | Sweden | Mar. 16, 1948 |